United States Patent [19]

Propster et al.

[11] Patent Number: 4,778,503
[45] Date of Patent: Oct. 18, 1988

[54] METHOD AND APPARATUS FOR PREHEATING GLASS BATCH

[75] Inventors: Mark A. Propster, Gahanna; Charles M. Hohman, Granville; Stephen Seng, Frazeysburg, all of Ohio

[73] Assignee: Owens-Corning Fiberglas Corporation, Toledo, Ohio

[21] Appl. No.: 584,296

[22] Filed: Mar. 2, 1984

Related U.S. Application Data

[63] Continuation of Ser. No. 335,007, Dec. 28, 1981, abandoned.

[51] Int. Cl.⁴ .................... C03B 27/00; C03B 3/00
[52] U.S. Cl. ............................................ 65/27; 65/335
[58] Field of Search ................... 65/27, 168, 335; 165/88; 106/DIG. 8; 432/16, 69, 117

[56] References Cited

U.S. PATENT DOCUMENTS

| 4,135,904 | 1/1979 | Suzuki et al. | 65/27 |
| 4,319,903 | 3/1982 | Hohman et al. | 65/27 |
| 4,338,113 | 7/1982 | Hohman et al. | 65/27 |

Primary Examiner—Kenneth M. Schor
Assistant Examiner—Michael K. Boyer
Attorney, Agent, or Firm—Patrick P. Pacella; Ted C. Gillespie

[57] ABSTRACT

A method and apparatus for preheating particulate glass batch comprises a rotatable drum for mixing batch with heat transfer media in a heat transfer relationship, means for directing the heated batch from the container to a glass melting furnace, means for venting gases and gas-borne particulate matter from the drum, means for separating a selected portion of the particulate matter from the vented gases, and means for directing the separated particulate matter into the glass melting furnace.

6 Claims, 1 Drawing Sheet

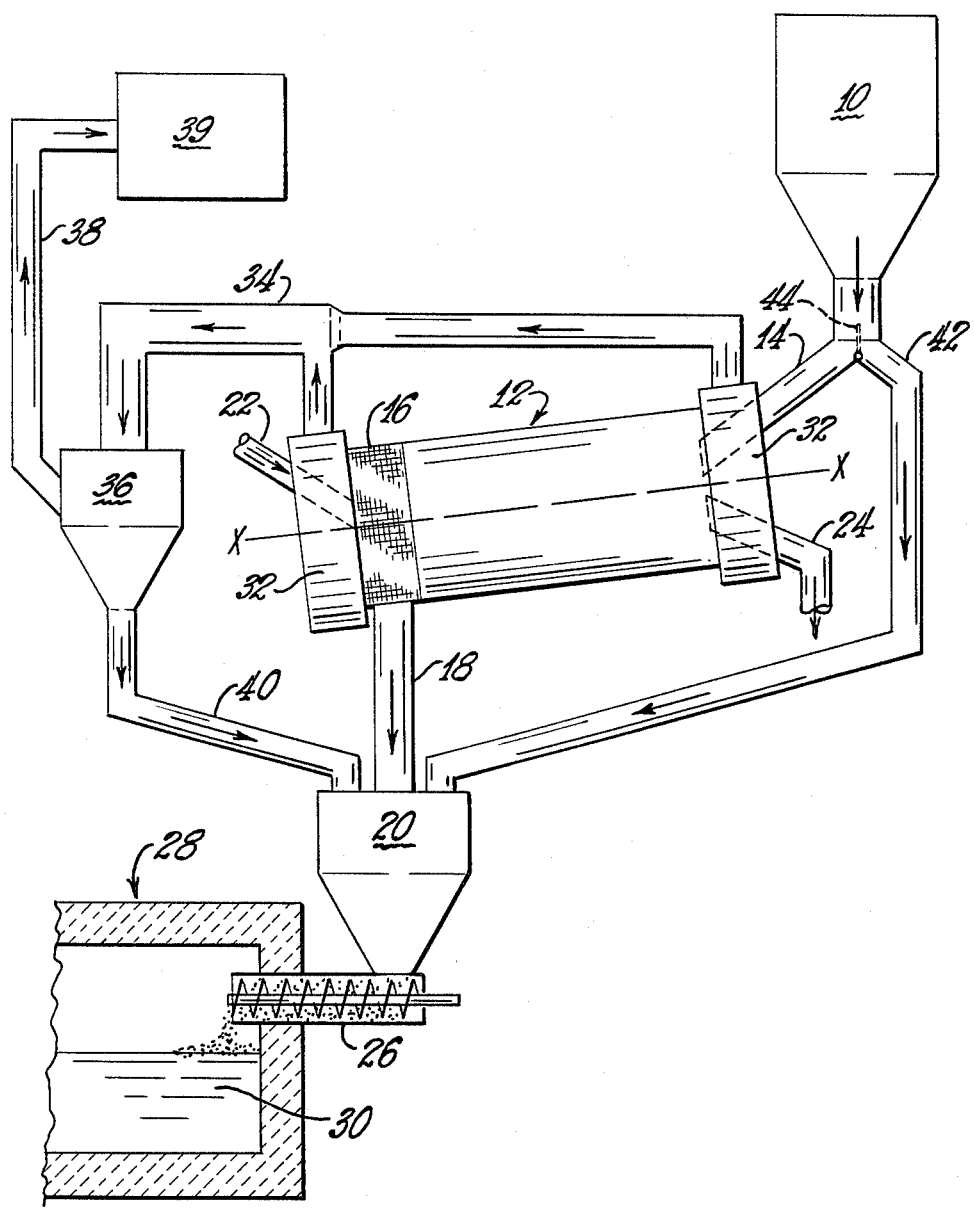

METHOD AND APPARATUS FOR PREHEATING GLASS BATCH

This is a continuation of application Ser. No. 335,007, filed Dec. 28, 1981 now abandoned.

TECHNICAL FIELD

This invention relates to a process for preheating glass batch which is the fed to a glass-melting furnace.

BACKGROUND OF THE INVENTION

One method for preheating glass batch involves feeding cold particulate glass batch raw materials into one end of a rotating heat-transfer drum, and feeding hot media of larger particle size than the batch particles into the other end of the heat transfer drum. The glass batch moves in direct and immediate physical contact with the heated media, with the batch flowing from the cold end to the hot end of the drum and the media flowing from the hot end to the cold end of the drum. The heated particulate batch is removed from the hot end of the drum, and the cooled media is removed from the cold end of the drum. Preferably, the heat transfer media is of a durable material and can be comprised of glass batch agglomerates, glass, ceramic material, steel, stainless steel, aluminum, or gravel. The media can be spherical in shape, and a useable example of such media is spherical ceramic balls. The media can be heated with an external burner or preferably heated by direct contact with exhaust gases from a glass melting furnace.

A problem with such a preheating apparatus and method is that it is not always desirable to direct the cold batch into the batch preheating apparatus. Therefore, it is necessary to provide a batch bypass conduit so the batch can be transferred directly from the batch supply into the glass melting furnace. It has been found, however, that the time required to effect a simple switching of directing the batch either into the batch preheater or into the batch bypass line can be a long period of time, such as up to ten hours or more. This is because the batch preheating method has the undesirable effect of driving off one of the glass batch constituents, thereby changing the chemical composition of the heated glass batch being directed from the batch preheater into the glass melting furnace. Specifically, it has been found that the borax constituent of the particulate glass batch is intumesced in the batch preheater, and the intumesced borax is removed with other vented gases during the preheating process. In order to accommodate the loss of the borax in past attempts to preheat batch, the borax component of the cold batch had to be increased. Thus, a separate batch supply, having an increased borax component, was needed to supply the glass melting furnace when the batch preheater was to be in use. This made it difficult and time consuming to switch from an operation using the batch preheater to an operation in which the batch preheater was not employed. There has now been developed a method and apparatus for preheating particulate glass batch in which the heated glass batch contains substantially the same chemical constituents as the cold particulate glass batch.

SUMMARY OF THE INVENTION

According to this invention, there is provided apparatus for preheating particulate glass batch comprising a rotatable container for mixing the batch with heat transfer media in a heat transfer relationship, means for receiving heated batch from the container, means for venting gases and gas-borne particulate matter from the container, means for separating a selected portion of the particulate matter from the vented gases, and means for directing the separated particulate matter into the means for receiving the heated batch.

In one embodiment of the invention, the means for separating comprises means for separating the particulate matter having the greatest mass from the vented gases.

In another embodiment of the invention, the means for receiving batch is a glass melting furnace.

According to this invention, there is also provided apparatus for preheating particulate glass batch comprising a rotatable container for mixing the batch with particulate heat transfer media in a heat transfer relationship, a glass melting furnace for receiving heated batch from the container, a dust vestibule positioned at one end of the container for venting gases and gas-borne particulate matter from the container, means for separating a selected portion of the particulate matter from the vented gases, and means for directing the separated particulate matter into the glass melting furnace.

In a preferred embodiment of the invention, the batch contains borax which is intumesced in the container as gas-borne particulate matter, and in which the means for separating is adapted to separate the intumesced borax from the vented gases.

In the most preferred embodiment of the invention, the means for separating comprises a cyclone separator.

According to this invention, there is provided apparatus for supplying particulate glass batch from a batch supply to a glass melting furnace comprising (a) means for preheating the particulate glass batch, the means for preheating comprising a batch container for mixing the batch with heat transfer media in a heat transfer relationship, means of directing heated batch from the container into the glass melting furnace, means for venting gases and gas-borne particulate matter from the container, means for separating a selected portion of the particulate matter from the vented gases, and means for directing the separated particulate matter into the glass melting furnace, (b) a batch bypass conduit for directing batch from the batch supply to the glass melting furnace, and (c) means for switching the path of particulate glass batch flowing from the batch supply so that the batch is directed into either the means for preheating or the batch bypass conduit.

According to this invention, there is provided a method for preheating particulate glass batch comprising rotating a container to mix the batch with particulate heat transfer media in a heat transfer relationship, directing heated batch from the container into a glass melting furnace, venting gases and gas-borne particulate matter from the container, separating a selected portion of the particulate matter from the vented gases, and directing the separated particulate matter into the glass melting furnace.

In a particular embodiment of the invention, the separating step comprises separating the particulate matter having the greatest mass from the vented gases.

In a preferred embodiment of the invention, the batch contains borax which is intumesced in the container as gas-borne particulate matter, and in which the separating step comprises separating the intumesced borax from the vented gases.

According to this invention, there is also provided a method for supplying particulate glass batch from a batch supply to a glass melting furnace comprising (a) preheating the particulate glass batch in a batch container by mixing the batch with heat transfer media in a heat transfer relationship, directing heated batch from the container into the glass melting furnace, venting gases and gas-borne particulate matter from the container, separating a selected portion of the particulate matter from the vented gases, and directing the separated particulate matter into the glass melting furnace, (b) directing batch from the batch supply to the glass melting furnace via a batch bypass conduit, and (c) switching the path of particulate glass batch flowing from the batch supply so that the batch is directed into either the means for preheating or the batch bypass conduit.

DESCRIPTION OF THE DRAWING

The drawing is a schematic view in elevation of the invention including a rotary drum heat exchanger and a cyclone particle separator.

DESCRIPTION OF THE INVENTION

This invention will be described in terms of a glass particulate batch preheating operation, although it is to be understood that the term "glass" includes other heat-softenable mineral material, such as rock, slag and basalt.

As shown in the drawing, particulate glass batch is directed from batch supply 10 into a rotatable heat exchange container, such as heat exchange drum 12 via batch inlet conduit 14. Preferably, the heat exchange drum is mounted at an angle to the horizontal, so that the heated batch can be removed via batch discharge screen 16 and directed via hot batch conduit 18 into a suitable means for recovering the heated batch, such as batch charger hopper 20. Heat transfer media, such as ceramic balls, can be heated by hot gases from the glass furnace in such means as a media heat exchanger, not shown, and directed via media inlet 22 into the heat exchange drum. Media discharge conduit 24 at the cold end of the heat exchange drum can be provided for discharging the cooled heat transfer media. Batch charger 26 directs the batch, either preheated or unheated, from the batch charger hopper into glass furnace 28, where the particulate glass batch is melted to form molten glass 30.

A typical wool glass batch is:

| Ingredient | Weight Percent |
|---|---|
| Central Silica Sand | 40.96 |
| 5 Mol Borax | 10.77 |
| Burnt Dolomite | 4.68 |
| Soda Ash | 14.71 |
| Barytes | 3.02 |
| Nepheline Syenite | 11.85 |
| Spore Limestone | 7.94 |
| Carbon | 0.05 |
| Cullet | 6.00 |

One of the aspects of the heat transfer process in the rotating heat transfer drum is that a portion of the 5 mol borax is heated to the extent that it intumesces and becomes airborne. The heating of the batch in the heat exchange drum also creates other volatiles, and these volatiles must be removed and treated for pollution control purposes. Accordingly, positioned at either one end or both ends of the heat exchange drum are dust vestibules 32 which are adapted to remove gases and airborne particulate matter from the heat exchange drum. The gases are then drawn via dust collection piping 34 into a means for separating a selected portion of the particulate matter from the vented gases, such as cyclone particle separator 36. The cyclone particle separator separates the particulate melter having the greatest mass, including the intumesced borax, from the gases and particulate matter having the least mass. In the preferred embodiment of the invention, a Flex Kleen, size 14, cyclone separator manufactured by Flex-Kleen Corporation, Chicago, Ill., is used. Gases and the lighter particles can be removed from the cyclone particle separator via dust recovery conduit 38 and treated in a suitable fashion, such as recovering particulate matter in baghouse 39. The intumesced borax, having been separated from the vented gases in the cyclone particle separator, can be directed by borax recovery conduit 40 into the batch charger hopper.

Batch bypass line 42 is positioned to direct batch directly from the batch supply to the batch charger hopper. Means for switching the path of the particulate glass batch flowing from the batch supply, such as batch supply switch 44, can be used to direct the flow of batch into either the preheating apparatus or into the batch bypass conduit. The ability to switch from a batch preheat mode into a cold batch mode enables cleaning and maintenance of the batch preheating apparatus and shorter throughput for batch composition changes.

In a typical utilization of the invention, the particulate batch material entering the heat exchange drum contains 100% of the required 5 mol borax. Approximately 10% of the 5 mol borax is intumesced in the heat exchange drum and removed via the dust vestibules to the cyclone particle separator. The other 90% of the 5 mol borax exits the heat exchange drum with the hot batch. The cyclone particle separator separates approximately 80% of the vented intumesced 5 mol borax from the vented gases and returns the separated borax to the batch charger hopper via the borax recovery conduit. Approximately 20% of the vented intumesced borax is lost from the cycle via the dust recovery conduit. the resulting batch in the batch charger hopper contains approximately 98% of the desired 5 mol borax. Absent the borax recovery system of the present invention, the preheated batch being fed through the glass furnace would contain only 90% of the required 5 mol borax.

It will be evident from the foregoing that various modifications can be made to this invention. Such, however, are considered as being within the scope of the invention.

We claim:

1. The method of preheating particulate glass batch comprising rotating a container to mix said batch with particulate heat transfer media in a heat transfer relationship, said mixing being effective to cause one or more batch constituents to become gas-borne, thereby altering the batch composition, one of said batch constituents being borax which is intumesced in said container as gas-borne particulate matter, directing heated batch from said container into a means for receiving the heated batch, venting gases and the intumesced borax batch constituent from said container, separating the intumesced borax batch constituent from said vented gases, and directing the separated borax batch constituent into said means for receiving the heated batch to continuously maintain the original batch composition.

2. A method for supplying particulate glass batch from a batch supply to a glass melting furnace comprising (a) establishing a batch preheat mode for preheating the particulate glass batch in a batch container, including mixing said batch with heat transfer media in a heat transfer relationship, said mixing being effective to cause one or more batch constituents to become gas-borne, thereby altering the batch composition, directing heated batch from said container into said glass melting furnace, venting gases and said gas-borne batch constituent from said container, separating said batch constituent from the vented gases, and directing the separated batch constituent into said glass melting furnace to continuously maintain the original batch composition, (b) establishing a cold batch mode, including directing batch from said batch supply to said glass melting furnace via a batch bypass conduit, and (c) switching the path of particulate glass batch flowing from said batch supply from one of said modes to the other of said modes.

3. Apparatus for preheating particulate glass batch comprising a rotatable container for mixing said batch with particulate heat transfer media in a heat transfer relationship, said mixing being effective to cause one or more batch constituents to become gas-borne, thereby altering the batch composition, one of said batch constituents being borax which is intumesced as gas-borne particulate matter, a glass melting furnace for receiving heated batch from said container, a dust vestibule positioned at one end of said container for venting gases and said gas-borne borax batch constituent from said container, means for separating said gas-borne borax batch constituent from the vented gases, and means for directing said gas-borne borax batch constituent into said glass melting furnace to continuously maintain the original batch composition.

4. Apparatus for preheating particulate glass batch comprising a rotatable container for mixing said batch with particulate heat transfer media in a heat transfer relationship, said mixing being effective to cause one or more batch constituents to become gas-borne, thereby altering the batch composition, a glass melting furnace for receiving heated batch from said container, a dust vestibule positioned at one end of said container for venting gases and said gas-borne batch constituent from said container, means for separating said batch constituent from the vented gases, said means for separating comprising a cyclone separator for separating the particulate matter having the greatest mass from the vented gases, and means for directing the separated batch constituent into said glass melting furnace to continuously maintain the original batch composition.

5. The apparatus of claim 4 comprising two dust vestibules, one positioned at each end of said container.

6. Apparatus for supplying particulate glass batch from a batch supply to a glass melting furnace comprising (a) means for preheating the particulate glass batch, said means for preheating comprising a batch container for mixing said batch with heat transfer media in a heat transfer relationship, said mixing being effective to cause one or more batch constituents to become gas-borne, thereby altering the batch composition, means for directing heated batch from said container into said glass melting furnace, means for venting gases and said gas-borne batch constituent from said container, means for separating said batch constituent from the vented gases, and means for directing the separated batch constituent into said glass melting furnace to continuously maintain the original batch composition, (b) a batch bypass conduit for directing batch ffrom said batch supply to said glass melting furnace, and (c) means for switching the path of particulate glass batch flowing from said batch supply so that the batch is directed into either said means for preheating or said batch bypass conduit.

* * * * *